United States Patent [19]
Christian et al.

[11] 3,781,546
[45] Dec. 25, 1973

[54] SELF ALIGNING BEAM WAVEGUIDE HAVING A SERIES OF LENSES AND MEANS FOR MAINTAINING SAID LENSES IN ALIGNMENT

[75] Inventors: Joseph Robert Christian, Colts Neck; Georg J. E. Goubau, Eatontown; James W. Mink, Neptune, all of N.J.

[73] Assignee: The United States of America as represented by the Secretary of the Army, Washington, D.C.

[22] Filed: Oct. 29, 1968

[21] Appl. No.: 771,539

[52] U.S. Cl. .... 250/201 R, 250/209 R, 350/96 WG
[51] Int. Cl. ................................................ G01j 1/20
[58] Field of Search.................... 250/201, 204, 208, 250/209; 350/96; 356/152

[56] References Cited
UNITED STATES PATENTS

| | | | |
|---|---|---|---|
| 2,651,715 | 9/1953 | Hines | 350/54 X |
| 3,316,800 | 5/1967 | Kibler | 250/201 X |
| 3,494,699 | 2/1970 | Gloge | 356/121 |
| 3,466,111 | 9/1969 | Ring | 350/96 WG |

*Primary Examiner*—James W. Lawrence
*Assistant Examiner*—D. C. Nelms
*Attorney*—Harry M. Saragovitz, Edward J. Kelly, Herbert Berl and Jeremiah G. Murray

[57] ABSTRACT

A self-aligning beam waveguide having a series of guiding elements spaced along a path extending between an electromagnetic beam transmitter and receiver. Associated with each of the guiding elements are radiation detectors for detecting the relative displacement between the beam center and the aperture center of the associated element. A control circuit is connected between a detector located at one element and a realigning motor located at the immediately preceding element. The control circuit energizes the motor to cause the associated element to deflect the beam in such a direction as to reduce the amount of displacement between the beam center and the aperture center of the element associated with the detector. A cycling circuit energizes the control circuits one at a time and in succession.

12 Claims, 4 Drawing Figures

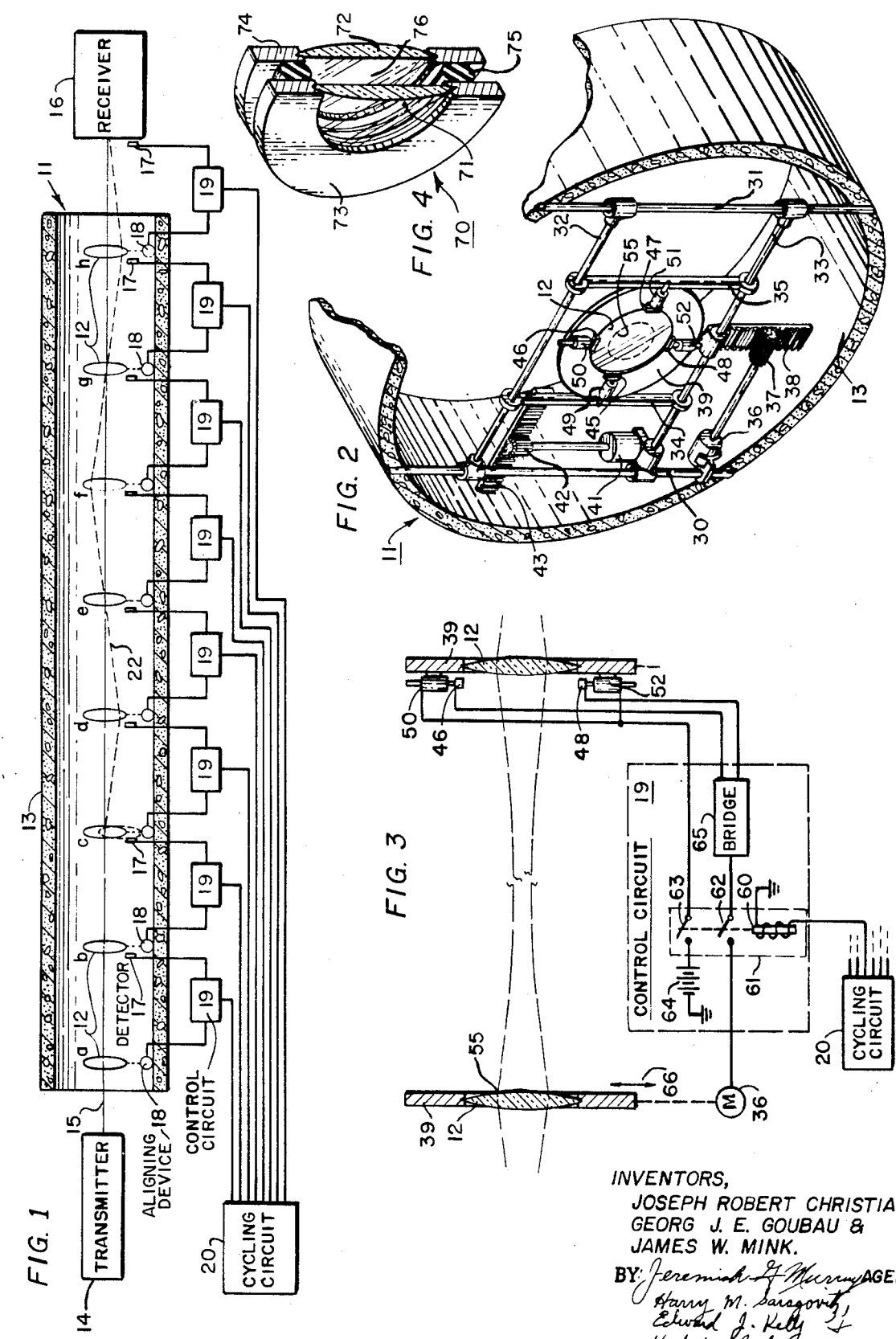

SELF ALIGNING BEAM WAVEGUIDE HAVING A SERIES OF LENSES AND MEANS FOR MAINTAINING SAID LENSES IN ALIGNMENT

The invention described herein may be manufactured, used, and licensed by or for the Government for governmental purposes without the payment to us of any royalty thereon.

The present invention relates to waveguides and more particularly to self-aligning beam waveguides.

In the field of communications, the beam waveguide has been used to guide electromagnetic energy in the form of narrow beams over long distances. The beam waveguide in general is a device comprising a series of beam guiding elements in the form of phase correcting and/or direction changing means spaced along a path extending between two distant points. Although prior art beam waveguides have to some extent served the intended purposes, they have not proved entirely satisfactory for the reason that slight misalignments of the guiding elements, which may be due to slight movements of the mounting structures, have resulted in considerable transmission loss. For example, when the waveguide is used to transmit a laser beam and the guiding elements such as lenses, prisms, and reflectors are mounted in a concrete pipe which may be buried in the ground, relatively small misalignments of one of the guiding elements due to settling of the ground may result in a considerable transmission loss. Therefore, those concerned with the development of beam waveguides have long recognized the need for a highly efficient, simple, and inexpensive realigning system. For example, one of the most critical problems confronting designers of realigning systems has been the transmission losses contributed by the realigning system itself. The present invention keeps to a minimum such losses while still maintaining the overall structure of the waveguide simple and inexpensive.

The general purpose of this invention is to provide a beam waveguide aligning system having radiation detectors which intercept only a small portion of the beam at only one guiding element at a time and having adjusting means responsive to the detectors for adjusting the alignment of only one element at a time and in sequence.

The exact nature of this invention as well as other objects and advantages thereof will be readily apparent from consideration of the following specification relating to the annexed drawing in which:

FIG. 1 shows schematically the beam waveguide of the present invention;

FIG. 2 is an isometric view of a portion of the beam waveguide of the present invention;

FIG. 3 is a schematic representation which shows in more detail a portion of the device of FIG. 1; and FIG. 4 is an isometric view in section of a modified guiding element.

Referring now to the drawings, wherein like reference characters designate like or corresponding parts throughout the several views, there is shown in FIG. 1 a beam waveguide 11 having a series of guiding elements, represented by equiconvex lenses 12a–12h, mounted in a casing 13. The lenses 12a–12h, when properly aligned, will guide a beam transmitted by transmitter 14 along a path 15 to a receiver 16. Since the path 15 is shown, for simplicity, as a straight line extending between the transmitter 14 and the receiver 16, the guiding elements or lenses 12a–12h will function primarily as phase correcting elements, i.e. they will prevent spreading of the beam. However, it is to be understood that the guiding elements 12 are shown as simple lenses for purposes of illustration only. A compound lens the axial deviation of which may be varied is shown in FIG. 4 and may also be used as guiding elements in place of or to supplement the lenses 12. A discussion of the use of phase correcting means and other guiding elements such as wedges, prisms, reflectors, etc., capable of guiding an electromagnetic beam over a curved path may be found in U. S. Pat. No. 3,101,472, issued to G. J. E. Goubau on Aug. 20, 1963.

Associated with each of the guiding elements 12 are an alignment detector 17, and an aligning device 18. The alignment detector 17 associated with one guiding element is connected via a control circuit 19 to the aligning device 18 associated with the immediately preceding guiding element. A cycling circuit 20 is connected to all of the control circuits 19.

For purposes of describing the operation of the device of FIG. 1 it will be assumed that transmitter 14 is a source of laser light modulated in accordance with some information which is to be transmitted via the beam wave-guide 11 to a distant receiver 16 which may include a simple photodetector. The receiver 16 and transmitter 14 might, for example, be separated by hundreds of miles, in which case the casing 13 could be a concrete pipe buried in the ground and extending between the distant locations. The lenses 12 are provided at spaced points along the guide primarily to correct the phase of the wave-front or, in other words, to make corrections for the normal beam divergence and to therefore insure a high-intensity beam at the receiver 16.

A guiding element 12, whether it be merely a lens or a more complicated device, such as shown in FIG. 4 and to be described later, would be effectively misaligned with respect to the immediately preceding guiding element 12 if the beam center were displaced relative to the aperture center of the guiding element 12 in question. For example, a lateral movement of lens 12c from the solid-line position to the dotted-line position in FIG. 1 would cause the beam to be deflected from the solid-line path 15 to the dotted-line path 22. This lateral movement of the lens 12 may, for example, be a result of movements due to ground settling under the weight of the casing 13. Therefore, since path 22 does not pass through the aperture center of lens 12d, then the lens 12d is considered to be effectively misaligned with respect to lens 12c. Also, this movement of lens 12c has caused effective misalignments between other adjacent lenses as well. For example, the lens 12f is effectively misaligned with respect to lens 12e, since the beam center or path 22 does not pass through the aperture center of lens 12f. The structure of the present invention makes no direct attempt to determine which of the lenses 12 physically moved out of alignment to cause the effective misalignments along the guide. The structure, as will be described shortly, merely corrects, one at a time and in succession, the effective misalignments between adjacent lenses. Of course, it can be shown that after some relatively small number of cycles all of the simple lenses 12 will be both physically and effectively aligned with respect to each other. A detailed analysis showing both computed and tested results for the realignment of an arbitrarily misaligned beam waveguide using simple lenses may be found in the following article authored by the present inventors, *Self-Aligning Optical Beam Waveguides*, IEEE Journal of Quantum Electronics, Vol. QE-3, Number 11, Pp. 498–503, Nov. 1967.

A detector 17, when energized by the associated control circuit 19 is designed as will be later described, to detect the relative position of the beam center with respect to the aperture center of the associated lens. If a detector 17 should detect a relative displacement between the beam center and the aperture center of the associated lens, then a signal will be generated in the associated control circuit 19 which will indicate the direction of the displacement and energize the aligning device 18 associated with the preceding lens. A device 18 when energized will realign the associated lens 12 to eliminate or reduce the effective misalignment, or in other words, device 18 will move the lens 12 or otherwise affect the guiding element to cause the beam center to move toward the aperture center of the succeeding lens. The effective misalignment of two adjacent lenses, as explained earlier, may be due to the movement of one of the two lenses in question or the movement of some one of the other preceding lenses. However, the detectors 17 detect only the direction of an effective misalignment between two adjacent lenses and have no way of determining the actual cause of the effective misalignment. The cycling circuit 20 will continuously energize the control circuits 19 one at a time and in succession. The eventual alignment of all the simple lenses 12 will be completed after some time period, which will depend primarily on which lens 12 caused the misalignments and at what portion of the cycle the cycling circuit 20 was in when the misalignment occurred. For example, if lens 12c moved from the solid-line position to the dotted-line position, as shown in FIG. 1, at the same time that the cycling circuit was energizing the control device 19 located between lenses 12c and 12d, then the misalignment would be corrected immediately since movement of lens 12c would correct all other effective misalignments. However, if cycling circuit 20 were in some other portion of the cycle, complete alignment could take several cycles. As will be explained later, a waveguide using more complicated guiding elements such as shown in FIG. 4 would require only one cycle to effect realignment.

FIG. 2 shows in greater detail a section of the beam waveguide 13 containing one of the guiding elements or lenses 12 and the associated aligning device 18 and detector 17. The aligning device 18 comprises a pair of vertical bars 30 and 31 mounted rigidly in the casing 13. A pair of horizontal bars 32 and 33 are slidably mounted on bars 30 and 31 for movement in the vertical direction. A pair of vertical bars 34 and 35 are slidably connected to bars 32 and 33 for movement in a vertical plane and in a horizontal direction. A mounting frame 39, which holds lens 12, is mounted rigidly between bars 34 and 35. A motor 36 is rigidly connected to bar 30 and turns a gear 37 which mates with rack 38 which in turn is rigidly connected to bar 33. Upon energization of motor 36 bars 32 and 33 will slide on bars 30 and 31 thereby moving lens 12 in a vertical direction. Movement of the lens 12 in the horizontal direction is effected by energization of a motor 41 which is rigidly mounted on bar 33 and turns a gear 42 which mates with a rack 43 which in turn is mounted rigidly to bar 34.

The detector device 17 of FIG. 1 comprises a set of four radiation detectors 45, 46, 47, and 48 spaced in quadrature and mounted about lens 12. The detectors 45–48 are mounted on the armatures of solenoids, 49, 50 51 and 52 respectively. Upon energization of the solenoids, the detectors 46–48 will be moved in front of lens 12 to a point just inside the dotted circle 55 which represents the area through which the electromagnetic beam should pass, if the lens 12 is to be effectively aligned with the preceding lens. Therefore, the lens 12, as shown in FIG. 2, can be moved in any direction in the vertical plane by a combination of movements of the motors 36 and 41. Also, a misalignment of the lens 12 with respect to the immediately preceding lens can be determined by detectors 45–48 when moved in front of the lens 12. For example, if the beam does not pass through the area outlined by the dotted circle 55, the detectors 45–48 will intercept unequal amounts of electromagnetic energy which will be an indication of an effective misalignment. The direction of the misalignment will depend on which of the detectors 45–48 intercept the most amount of energy.

The interconnection between the detectors 45 and 47, the control circuit 19, the cycling circuit 20, and the motor 36 is shown in FIG. 3. This representation shows the structure needed to correct effective misalignments in only the vertical direction. A similar arrangement, of course, would be required for control in the horizontal direction. The cycling circuit 20 which may be a stepping relay will energize, for a predetermined time period, the coil 60 of a relay 61 in the control devices 19 one at a time and in sequence. Upon energization of coil 60, normally open contacts 62 and 63 will close, thereby completing a circuit from battery 64 through the windings of solenoids 50 and 52, and also from the output of a bridge 65 to the motor 36. The detectors 46 and 48, which are connected to the bridge 65, will now be moved in front of lens 12. These detectors 46 and 48 must intercept some predetermined relative amounts (usually equal) of radiation in order to maintain balance of the bridge 65. When the bridge 65 is balanced there will be no output signal to motor 36. However, if the bridge 65 is unbalanced an output signal will be transmitted to motor 36 which will then move the associated lens 12 in one of the two directions indicated by the arrow 66. The polarity of the signal from bridge 65 will determine which of the two directions the motor 36 will move the lens 12. The output polarity from bridge 65 will in turn depend on which of the two detectors 46 and 48 is intercepting the greater amount of radiation. For example, if detector 46 should intercept relatively more radiation, the bridge 65 will be unbalanced in a direction which will cause a signal of a polarity such as to cause motor 36 to move lens 12 down. It is pointed out, that the motor 36 could move the lens 12 until the effective misalignment is corrected i.e. until the output of bridge 65 is zero; or motor 36 could move the lens 12 some predetermined increment for each cycle. After the control device 19 has been energized by cycling circuit 20 for the predetermined time, the coil 60 is deenergized, the contacts 62 and 63 open, and the immediately succeeding control device 19 is energized by cycling circuit 20. This process is then repeated continuously.

As pointed out earlier, waveguide 11 could be designed to guide a beam over a bent path by incorporating guiding elements which have an axial deviation. For example, a reflector or prism could be used to cause the beam to deviate from some initial path onto a new path. Such guiding elements could, of course, be maintained in alignment by using substantially the same alignment structure described above. FIG. 4 shows a guiding element 70 which is capable of both correcting the phase of the beam and bending the beam. Also, the angle through which the beam is bent by element 70 can be varied or controlled, because guidng element 70 has a variable axial deviation.

Element 70 includes a pair of spaced plano-convex lenses 71 and 72 rigidly mounted in rings 73 and 74 respectively. A flexible rubber seal 75 is mounted between the rings 73 and 74 to form a liquid tight chamber 76. A transparent liquid (not shown) having an index of refraction equal to that of the lenses 71 and 72 fills the chamber 76. The lenses 71 and 72 are designed to produce the correct amount of phase correction to the beam when mounted in a waveguide. Also, the element 70 is capable of an axial deviation since the liquid contained in chamber 76 may act as a prism. When the lenses 71 and 72 have their plane surfaces parallel, there will be no axial deviation since the width of chamber 76 is constant. However, if the rings 73 and 74 are squeezed together at some predetermined location, so that the thickness of the chamber 76 is different at different locations or in otherwords the lenses 71 and 72 are no longer parallel, then the liquid in chamber 76 will act as a prism and the beam will bend. Therefore, a beam entering the aperture center of lens 71 along a first direction can be made to leave the aperture center of lens 72 along a second direction which is at some predetermined angle to the first direction. Each of the guiding elements 70 could have the four detectors 45, 46, 47, and 48 mounted in quadrature on ring 73. The detectors 45–48 would be connected to the control device 19 in the same manner as shown in FIG. 3. However, the output of bridge 65 would be connected to an alignment device which would squeeze the rings 73 and 74 or otherwise cause the thickness of chamber 76 to change in some predetermined fashion so that the detected misalignment will be corrected. It can readily be seen that, alignment of a waveguide using elements 70 will be completed after each full cycle, since the aligning of two adjacent elements 70 does not disturb the alignment of the preceding elements 70.

Of course, FIG. 4 shows only one element which has both a variable axial deviation plus the ability to phase correct the beam. Many other types of elements which have both or one of these features are known in the art and could be used to make-up a complete beam guiding system.

Although the self-aligning beam waveguide has been described here for use mainly with a communications device, it could also find use as a geological or measuring instrument for detecting slight movements in the earth, for example, by maintaining a continuous record of the corrections made by the alignment devices.

What is claimed is:

1. An electromagnetic beam waveguide comprising;
a plurality of waveguide elements mounted in spaced relationship over a path;
each of said elements including:
a variable guiding means for directing a beam of electro-magnetic energy from one of said elements to the next succeeding element,
an alignment means for varying said guiding means,
a sensor means for detecting the relative displacement between the center of said beam and the aperture center of said guiding means, and
cyclically energizable control means connected to said sensor means and including output terminal means for providing an output signal proportional to the direction of said relative displacement;
means connecting said output terminal means to the alignment means of the immediately preceding waveguide element for causing said alignment means to vary said guiding means to reduce said relative displacement; and
means for energizing said control means of each of said elements one at a time and in succession.

2. The beam waveguide according to claim 1 and wherein said variable guiding means includes means for varying the cross-sectional phase distribution of said beam.

3. The beam waveguide according to claim 1 and wherein said alignment means includes means for moving said guiding means relative to said beam.

4. The beam waveguide according to claim 3 and wherein said guiding means is a lens.

5. The beam waveguide according to claim 1 and wherein said variable guiding means includes an axial deviation means for deflecting said beam through an angle.

6. The beam waveguide according to claim 5 and wherein said axial deviation means is variable.

7. The beam waveguide according to claim 6 and wherein said guiding means includes means for varying the cross-sectional phase distribution of said beam.

8. The beam waveguide according to claim 1 and wherein each said sensor means includes radiation detector means for selectively intercepting a portion of said beam and for generating a signal which is a function of the direction of said relative displacement.

9. The beam waveguide according to claim 8 and wherein said detector means includes means for intercepting said beam in four locations oriented about said beam in space quadrature.

10. The beam waveguide according to claim 8 and wherein said detector means includes four radiation detectors spaced in quadrature about the aperture of said guiding means; each said detector mounted on means connected to said control means for moving said detectors in front of said aperture, upon energization by said control means.

11. An optical guiding apparatus of the type comprising
a conduit through which a beam of optical radiation is to be transmitted,
a plurality of means disposed within said conduit for repositioning said beam within said conduit in response to respective actuation signals,
a plurality of means disposed in said conduit for sensing transverse position errors of said beam at a plurality of axial locations in said conduit, and means for coupling each of said sensing means to one of said repositioning means to coordinate the repositioning of said beam; including
a source of periodic pulses,
pulse transmission line means paralleling said conduit and supplied with said pulses,
means for transmitting signals from each sensing means, and a plurality of means each coupled respectively to said transmission line means at one of a set of spaced points and to one of said signal transmitting means for applying said actuation signals to each of said repositioning means upon the simultaneous occurrence of a signal from the coupled sensing means and the presence of a pulse at the respective point in said pulse transmission line means.

12. An optical guiding apparatus according to claim 11 in which the repositioning means are adapted to move in discrete steps in response to the signals from said sensing means.

* * * * *